US006990668B1

(12) United States Patent
Miller et al.

(10) Patent No.: US 6,990,668 B1
(45) **Date of Patent: *Jan. 24, 2006**

(54) APPARATUS AND METHOD FOR PASSIVELY MONITORING LIVENESS OF JOBS IN A CLUSTERED COMPUTING ENVIRONMENT

(75) Inventors: Robert Miller, Rochester, MN (US); Vicki Lynn Morey, Pine Island, MN (US); Kiswanto Thayib, Rochester, MN (US); Laurie Ann Williams, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/421,585

(22) Filed: Oct. 20, 1999

(51) Int. Cl.
*G06F 9/461* (2006.01)

(52) U.S. Cl. ....................... 718/106; 709/224; 719/313

(58) Field of Classification Search ................ 709/201, 709/205, 224, 248; 710/260–269; 718/100–106; 719/310–313

See application file for complete search history.

(56) References Cited

U.S. PATENT DOCUMENTS 5,029,124 A * 7/1991 Leahy et al. ................ 710/105
5,432,932 A * 7/1995 Chen et al. ................. 709/103
5,692,193 A * 11/1997 Jagannathan et al. ....... 709/106
5,727,210 A * 3/1998 Dwork et al. ............... 709/104
5,748,882 A * 5/1998 Huang ......................... 714/47
5,787,249 A * 7/1998 Badovinatz et al. ........ 709/201
6,108,699 A * 8/2000 Moiin
6,216,150 B1 4/2001 Badovinatz et al.
6,247,059 B1 6/2001 Johnson et al.
6,430,591 B1 8/2002 Goddard
6,487,580 B1 * 11/2002 Bobak et al.

* cited by examiner

*Primary Examiner*—St. John Courtenay, III
*Assistant Examiner*—George Lawrence Opie
(74) *Attorney, Agent, or Firm*—Martin & Associates, LLC; Derek P. Martin

(57) ABSTRACT

An apparatus and method passively determine when a job in a clustered computing environment is dead. Each node in the cluster has a cluster engine for communicating between each job on the node and jobs on other nodes. A protocol is defined that includes one or more acknowledge (ACK) rounds, and that only performs local processing between ACK rounds. The protocol is executed by jobs that are members of a defined group. Each job in the group has one or more work threads that execute the protocol. In addition, each job has a main thread that communicates between the job and jobs on other nodes (through the cluster engine), routes appropriate messages from the cluster engine to a work thread, and signals to the cluster engine when a fault occurs when the work thread executes the protocol. By assuring that a dead job is reported to other members of the group, liveness information for group members can be monitored without the overhead associated with active liveness checking.

21 Claims, 5 Drawing Sheets

900
950 Work Thread Did Not Receive All Expected ACKs
960 Query User for Appropriate Action
962 Kill Work Thread? YES / NO
964 Abort Protocol? YES / NO
970 Transmit NACK Message
980 Perform User-Specified Operations
910 Non-Recoverable Fault Occurs in Work Thread
920 Kill Work Thread
930 Main Thread Unregisters with CLUE
940 CLUE Transmits Membership Change to Group Members
Done Prior Art FIG. 3

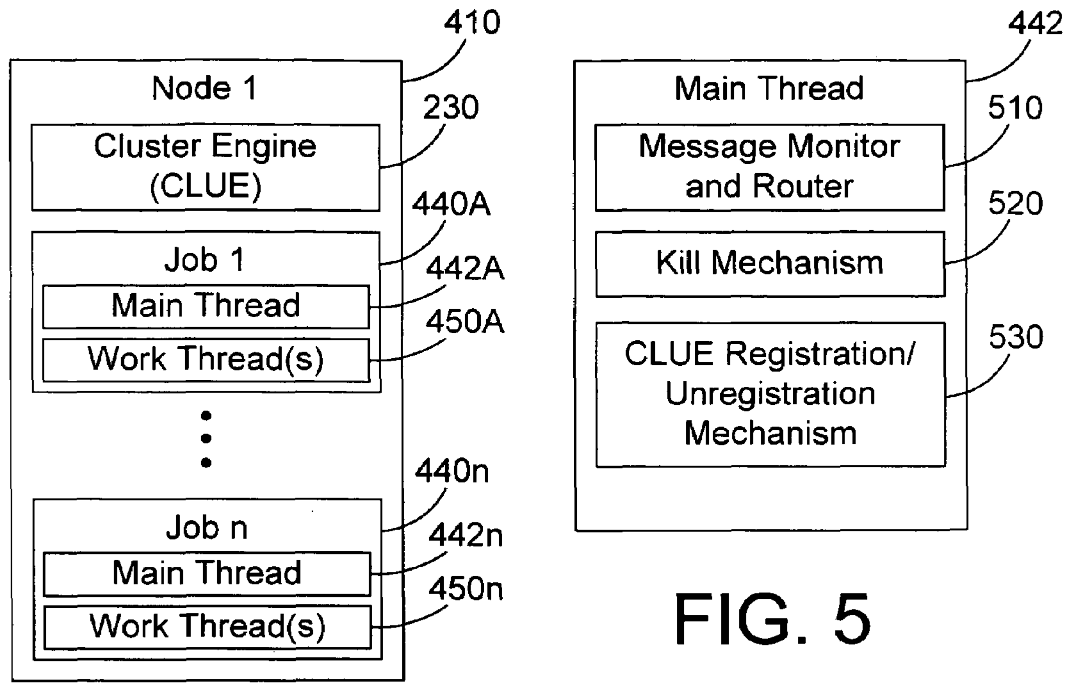
FIG. 4
FIG. 5
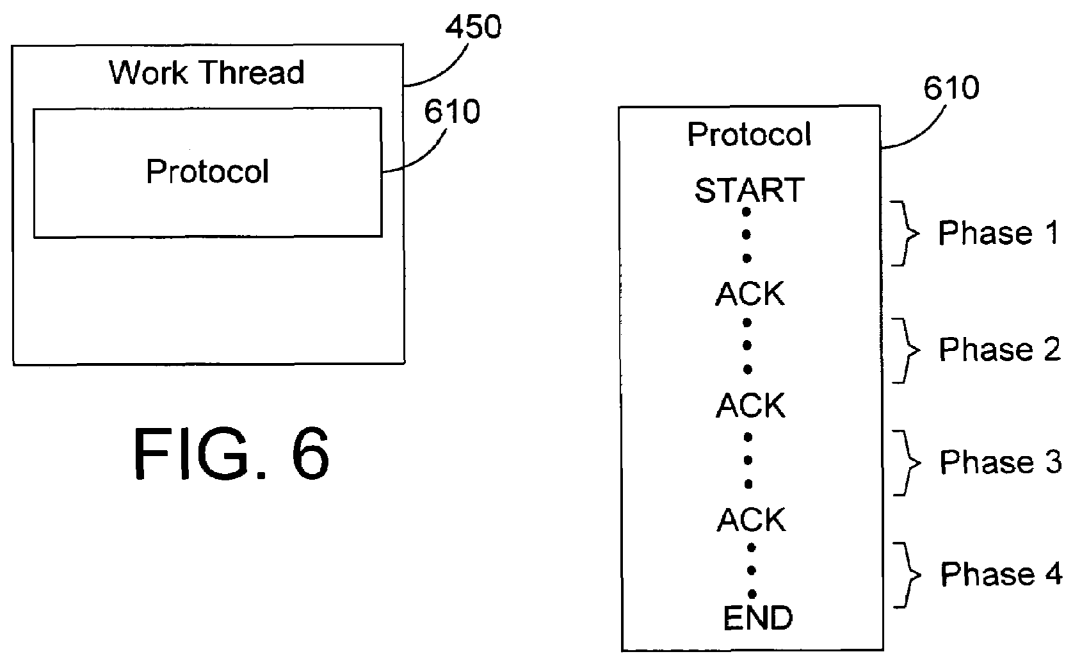
FIG. 6
FIG. 7

APPARATUS AND METHOD FOR PASSIVELY MONITORING LIVENESS OF JOBS IN A CLUSTERED COMPUTING ENVIRONMENT

BACKGROUND OF THE INVENTION

1. Technical Field

This invention generally relates to data processing, and more specifically relates to the sharing of tasks between computers on a network.

2. Background Art

Since the dawn of the computer age, computer systems have become indispensable in many fields of human endeavor including engineering design, machine and process control, and information storage and access. In the early days of computers, companies such as banks, industry, and the government would purchase a single computer which satisfied their needs, but by the early 1950's many companies had multiple computers and the need to move data from one computer to another became apparent. At this time computer networks began being developed to allow computers to work together.

Networked computers are capable of performing tasks that no single computer could perform. In addition, networks allow low cost personal computer systems to connect to larger systems to perform tasks that such low cost systems could not perform alone. Most companies in the United States today have one or more computer networks. The topology and size of the networks may vary according to the computer systems being networked and the design of the system administrator. It is very common, in fact, for companies to have multiple computer networks. Many large companies have a sophisticated blend of local area networks (LANs) and wide area networks (WANs) that effectively connect most computers in the company to each other.

With so many computers hooked together on a network, it soon became apparent that networked computers could be used to complete tasks by delegating different portions of the task to different computers on the network, which can then process their respective portions in parallel. The concept of a computer "cluster" has been used to define groups of computer systems on a network that can work on predefined tasks.

If an error occurs while processing some task that is defined for a group of computers in a cluster, there needs to be some way to detect that the error has occurred. In addition, there needs to be some way to distinguish an error from a task that takes a substantial period of time to run to completion. One known way to detect errors and distinguish errors from long processing times uses the concept of the "liveness" of a job.

A job is the work that a computer does for a user. The "liveness" of a job refers to whether a job is correctly executing its program. Known methods for checking liveness use an active liveness monitoring process that runs on each node in a group. Active liveness monitoring means a job is explicitly checked for liveness. The active liveness monitoring process sends out periodic inquiries asking a group member if it is still alive, and awaits a response from that job. This is done for all jobs on a computer that are members of a group. Typically, a predetermined period of time, such as 1–3 seconds, is selected that is longer than the longest anticipated processing time for any group member job. If a group member job does not respond within the predetermined time period, the job is presumed dead, and the remaining jobs can then take appropriate action.

Active liveness monitoring can take considerable system resources. Each liveness monitoring process must check liveness of all jobs on its node, and must also check to see if the other nodes are live as well. If the number of jobs and the number of nodes are high, the cluster may expend considerable and excessive resources performing the liveness checking of its members. Without a mechanism for passively monitoring liveness of group member jobs, the known active liveness checking will continue to be an excessive drain on system resources.

DISCLOSURE OF INVENTION

An apparatus and method passively determine when a job in a clustered computing environment is dead. Each node in the cluster has a cluster engine for communicating between jobs within the same group on other nodes. A protocol is defined that includes one or more acknowledge (ACK) rounds, and that only performs local processing between ACK rounds. The protocol is executed by jobs that are members of a defined group. Each job in the group has one or more work threads that execute the protocol. In addition, each job has a main thread that communicates between the job and jobs on other nodes (through the cluster engine), routes appropriate messages from the cluster engine to a work thread, and signals to the cluster engine when a fault occurs when the work thread executes the protocol. By assuring that a dead job is reported to other members of the group, liveness information for group members can be monitored without the overhead associated with active liveness checking.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and:

FIG. 4 is a block diagram of a node in accordance with the preferred embodiments that includes a main thread that indicates when its job is dead without any active liveness checks;

FIG. 5 is a block diagram of the main thread in FIG. 4;

FIG. 6 is a block diagram of one of the work threads in FIG. 4;

FIG. 7 is a block diagram of the protocol that is executed by the work thread of FIG. 6;

BEST MODE FOR CARRYING OUT THE INVENTION

The present invention is accomplished through sharing portions of tasks on computers that are connected on a network. For those who are not familiar with networking concepts, the brief overview below provides background information that will help the reader to understand the present invention.

1. Overview

Networked Computer Systems

Connecting computers together on a network requires some form of networking software. Over the years, the power and sophistication of networking software has greatly increased. Networking software typically defines a protocol for exchanging information between computers on a network. Many different network protocols are known in the art. Examples of commercially-available networking software is Novell Netware and Windows NT, which each implement different protocols for exchanging information between computers.

One significant computer network that has recently become very popular is the Internet. The Internet grew out of a proliferation of computers and networks, and has evolved into a sophisticated worldwide network of computer systems. Using the Internet, a user may access computers all over the world from a single workstation. TCP/IP (Transmission Control Protocol/Internet Protocol) is an example of a network protocol that is in wide use today for communicating between computers on the Internet. In addition, the use of TCP/IP is also rapidly expanding to more local area networks (LANs) and Intranets within companies.

Computer Clusters

The prior art recognized the benefit of having groups of computer systems work on different pieces of a problem. The concept of "clusters" of computers evolved to include a predefined group of networked computers that can share portions of a larger task. One specific implementation of a cluster uses ordered messages for communicating between the computers in a cluster. In an ordered message system, each message is communicated to all nodes, and the order of messages is enforced so that all nodes see the messages in the same order.

Figure 1:
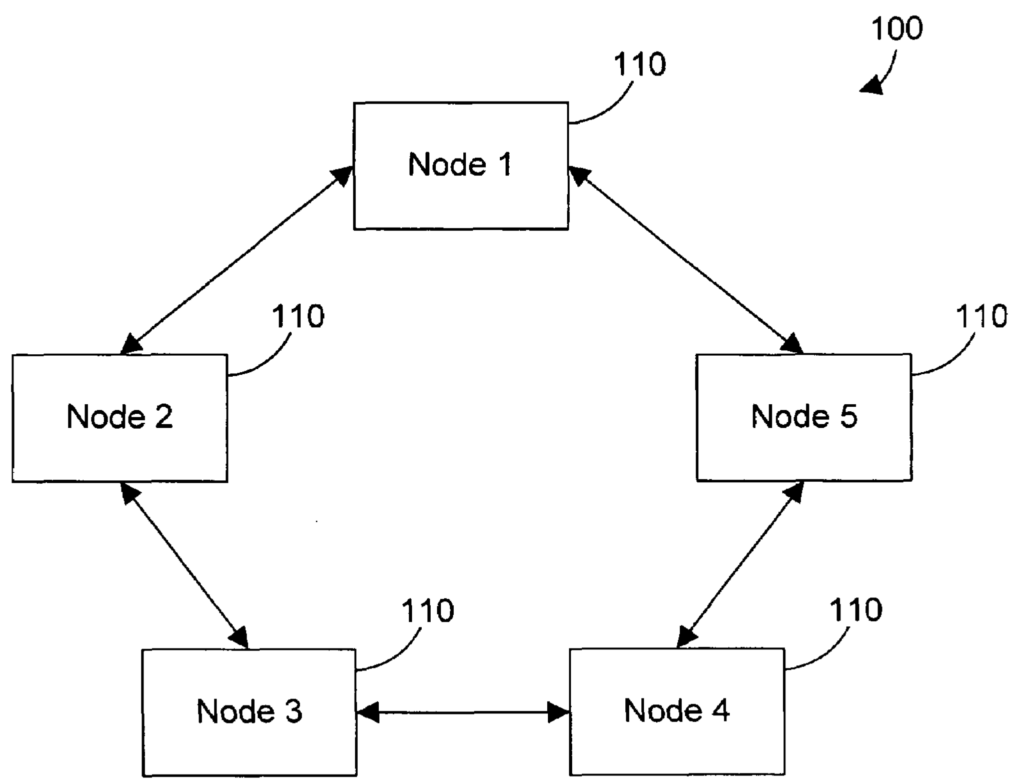
FIG. 1 is a block diagram of computer systems that may intercommunicate on a network.
Figure 2:
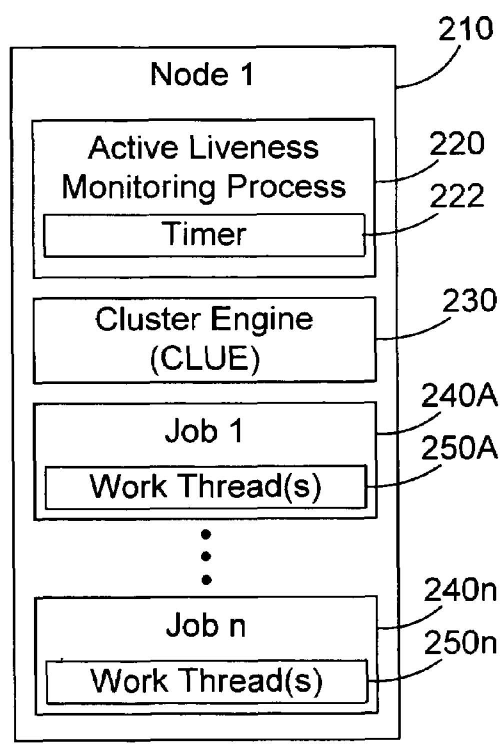
FIG. 2 is a block diagram of a prior art cluster node that includes an active liveness monitoring process.

Referring to FIG. 1, a simple cluster 100 of five computer systems (or "nodes") 110 is shown. The connections between these nodes represents a logical connection, and the physical connections can vary within the scope of the preferred embodiments so long as the nodes in the cluster can logically communicate with each other. Within a cluster, one or more "groups" may be defined, which correspond to logical groupings of nodes that cooperate to accomplish some task. Each node in a group is said to be a "member" of that group. As shown in FIG. 2, each node 210 in a prior art cluster includes an active liveness monitoring process 220, a cluster engine 230 (referred to herein as CLUE), and one or more jobs 240. Each job 240 includes one or more work threads 250 that execute the job 240, which amounts to a portion of the larger task that is being delegated to the members of the group. The active liveness monitoring process 220 includes a timer 222 that is used to determine the amount of time that passes from the point in time that a transmission of a liveness message is sent to a group member. If a group member does not respond within a predetermined period of time as measured by the timer 222, the non-responding member is presumed to be dead, and the remaining members of the group may then take appropriate action.

CLUE 230 is a software process that enforces ordered messages between nodes in a cluster. All messages by any member of the group are communicated to the node's local CLUE 230, which then communicates the message to all other members of the group. When a job 240 wants to be part of a group, it registers with CLUE 230 as a member of that group. This registration causes CLUE to generate a membership change message to other members of the group to inform the other members of the new addition to the group. In similar fashion, when a job 240 no longer wants to become a member of the group, it unregisters with CLUE 230, which also causes a corresponding membership change message to inform the remaining members of the group that a member has been deleted from the group. When CLUE 230 receives a message from its member that is intended for the group, CLUE 230 sends the message to all registered members.

Figure 3:
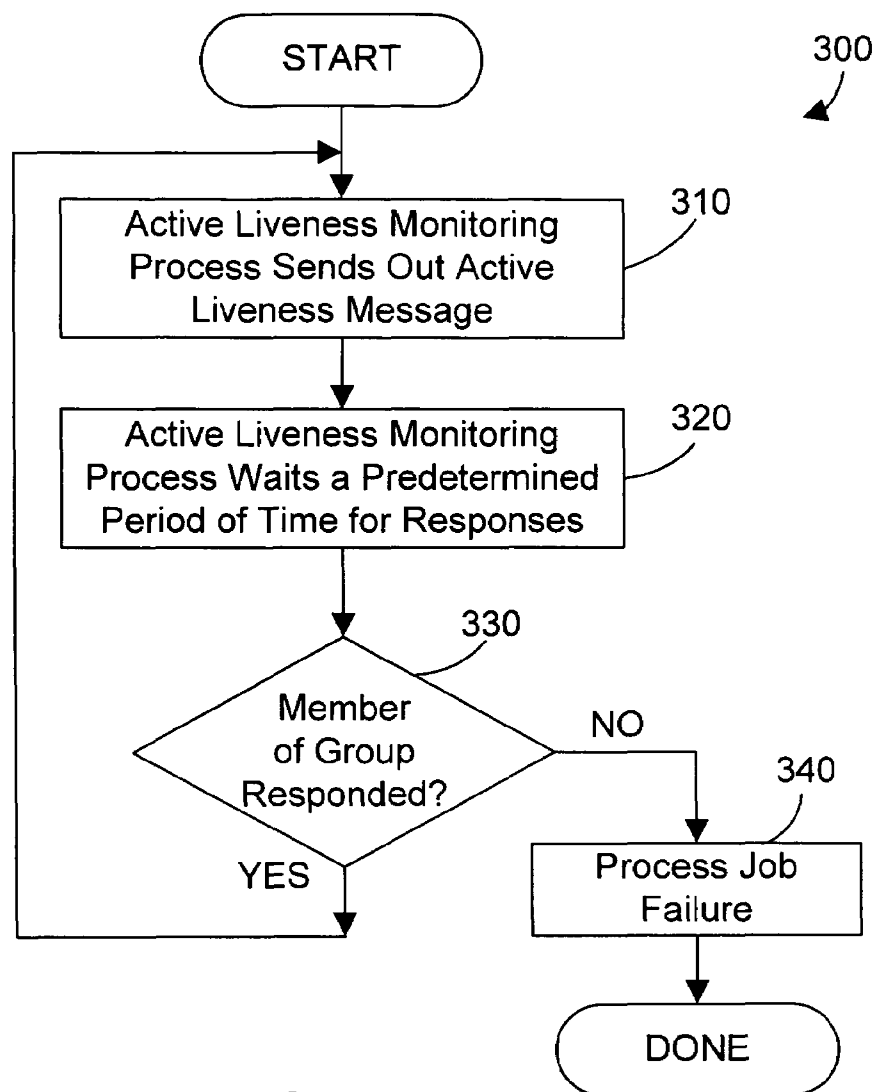
FIG. 3 is a flow diagram of a prior art method for actively checking the liveness of group members jobs in a cluster.

Referring to FIG. 3, a method 300 represents steps that are suitably performed by the active liveness monitoring process 220 in FIG. 2. The active liveness monitoring process 220 sends out an active liveness message to each member on this node (step 310). Each member responds back to the active liveness message an acknowledgment (ACK) or negative acknowledgment (NACK). An ACK means the member is functioning correctly, and a NACK means the member is not functioning correctly. The member checks itself for proper operation. These checks may include sending messages to other members in its group, checking the status of any currently executing protocol, or issuing a test/liveness protocol. After waiting a predetermined period of time (step 320), if all members of the group respond with an ACK (step 330=YES), method 300 loops back to step 310 and continues monitoring. If one or more members do not respond with an ACK (step 330=NO), this lack of response is treated as a failure, and the failure is processed appropriately (step 340). One known way for processing a failure is for CLUE to generate a membership change message to all group members when a member fails to respond during a liveness round. The active liveness monitoring process informs CLUE of a failing member and CLUE unregisters the failing member, and the resulting membership change message that CLUE sends informs all other members of the failing member.

As stated in the Background section, a major problem with the prior art active liveness monitoring described above with reference to FIGS. 2 and 3 is the constant drain of system resources to continually check the liveness of members of a group. A second problem with the prior art is the potential complexity of the active liveness check by a monitor and a member. It is difficult for a monitor to know if a timer expiration is due to a member job being slow to react, or due to a true error that has occurred. The failing member job needs to have itself terminated before another member can take over the failing member's duties, so the monitor needs to know not only when the failing job actually ends, but also may have to terminate it. Another problem with active liveness monitoring is that a liveness check can occur at any time, so a member may need to execute concurrently two protocols: the liveness check, and a currently executing protocol. Designing concurrent protocols is generally considered to be significantly more difficult that designing non-concurrent protocols. Yet another problem is the reliability of the active liveness monitor. Should the active liveness monitor fail, the system will never know of the failure. The present invention as described in the description of the preferred embodiments below provides an apparatus and method for passively monitoring liveness of group members, that only signals when a member is dead.

2. Detailed Description

According to a preferred embodiment of the present invention, an apparatus and method for passively monitoring liveness of group members overcomes the disadvantages of prior art active liveness monitoring schemes by providing an architected way for a group member to reliably report if its job is dead without having an active liveness monitoring process running on each node. There is very little overhead until an error is occurred, at which time the error can be processed appropriately. Thus, the significant overhead in prior art active liveness monitoring schemes has been all but eliminated, thereby greatly enhancing system performance.

Referring now to FIG. 4, a node 410 represents a node in a cluster, such as that shown in FIG. 1. Node 410 in accordance with the preferred embodiments includes a cluster engine (CLUE) 230, and one or more jobs 440. Each job 440 has one or more corresponding work threads 450. In addition, each job 440 also includes a single main thread 442 that is not found in the prior art.

FIG. 5 illustrates one suitable implementation for main thread 442, which includes a message monitor and router 510, a kill mechanism 520, and a CLUE registration/unregistration mechanism 530. The main thread 442 does not do any work on the job 440, but is a supervisory mechanism that passes messages from CLUE 230 to the work thread(s), and that detects when a work thread is not longer alive. The message monitor and router 510 monitors all messages received from CLUE 230. If a message is a special type of message (known as a "kill message") that tells the job to kill a specified work thread, main thread 442 uses the kill mechanism 520 to kill the specified work thread 450. Main thread 442 can also use kill mechanism 520 to kill a protocol by sending an abort message to a work thread. The work thread, in turn, sends a NACK message, which causes the protocol to abort. In addition, if the main thread 442 kills a work thread 450, whether by request of the work thread or by some unrecoverable error that occurs in the work thread, main thread 442 then unregisters with CLUE using the CLUE registration/unregistration mechanism 530. By unregistering with CLUE, all other members of the group know that the failing member is no longer a member of the group, and the remaining members can then process the error or take other appropriate action.

One suitable implementation of a work thread 450 in FIG. 4 is shown in FIG. 6. Work thread 450 is a thread of execution that actually performs the work of its corresponding job, as defined in a protocol 610. Protocol 610 is comprised of multiple phases that work thread 450 can perform. The present invention is made possible by defining certain characteristics of the main thread 442 and by defining certain characteristics of protocol 610.

For the preferred embodiments, group member liveness is defined to have two conditions: 1) responsiveness; and 2) progress. Responsiveness means that a member is able to read group messages. Progress means working meaningfully on a protocol (e.g., not in an infinite wait or in an endless loop). If a group member is responsive and is making progress, then it must be live.

The responsiveness of a group member is assured in the preferred embodiments by having a main thread 442 in each job 440. Main thread 442 performs limited functions that assure responsiveness. The main thread 442 only reads messages, forwards protocol messages to its work thread(s) 450, prioritizes messages as needed, and executes special messages, such as messages to terminate a work thread or to terminate the member job. No main thread can do any work that could lead to it not being available to read messages. This means that the main thread 442 cannot generate any ACK rounds, because waiting on an ACK round could result in the main thread being unavailable to read a message. In addition, the main thread 442 cannot wait to acquire a local resource (but it can still do work), because waiting may also result in the main thread being unavailable to read a message. By defining the main thread in this manner, we know that the main thread will always be available to read a message, so the other group members need not be concerned that a sent message was not received by another member. This means that each member can send messages to the group without explicitly checking to see if the messages were received.

Progress of a group member is assured by appropriately defining the structure of the protocol 610. Referring to FIG. 7, a protocol in accordance with the preferred embodiments is divided into a number of different phases divided by ACK rounds. Each phase is defined in a way that assures that the member only does local work during a phase. When information is needed from another member, the information is sent through CLUE and is followed by an ACK round. The result is that progress is ensured between ACK rounds, and any failure during an ACK round will be communicated by the failing member either issuing a NACK response or unregistering with CLUE. CLUE guarantees that if a member fails to respond during an ACK round (and thus unregisters with CLUE), CLUE sends a special message known as a membership change to all members left in the group. The membership change is treated as a negative acknowledge (NACK) signal from the member that did not respond. In one embodiment, the remaining members in response to a NACK signal undo the changes that were made during execution of the protocol. In another embodiment, the remaining members may determine that the failure of the dead member is not significant, and may then continue processing the protocol.

Because we know that the work thread 442 on each group member is always responsive, we know that each group member will receive and recognize the membership change. Because the work thread(s) only do local work between ACK rounds, the work thread will always progress to an ACK round (assuming no local deadlock), so each member is assured to see the membership change. Defining protocols such that only local work is done between ACK rounds means that a group member will always progress to an ACK round. Providing a main thread for each group member means that a group member will always be responsive. By assuring both progress and responsiveness in this manner, the present invention results in group members that will simply unregister with CLUE if an error occurs, resulting in a membership change message from CLUE to remaining group members. No active monitoring is required.

Another advantage of the present invention is that checking the state of a group member is relatively straightforward because the member is guaranteed to progress to an ACK round. All other members in a group will know how far each other member has progressed in the protocol by virtue of knowing which ACK round(s) have occurred. In addition, if more information about the failing member is desired, a query message may be sent to the work thread. Because the work thread is always responsive, it will receive the query and can respond to it. The result is that the query occurs at a well-defined point in a protocol, rather than at any time.

Figure 8:
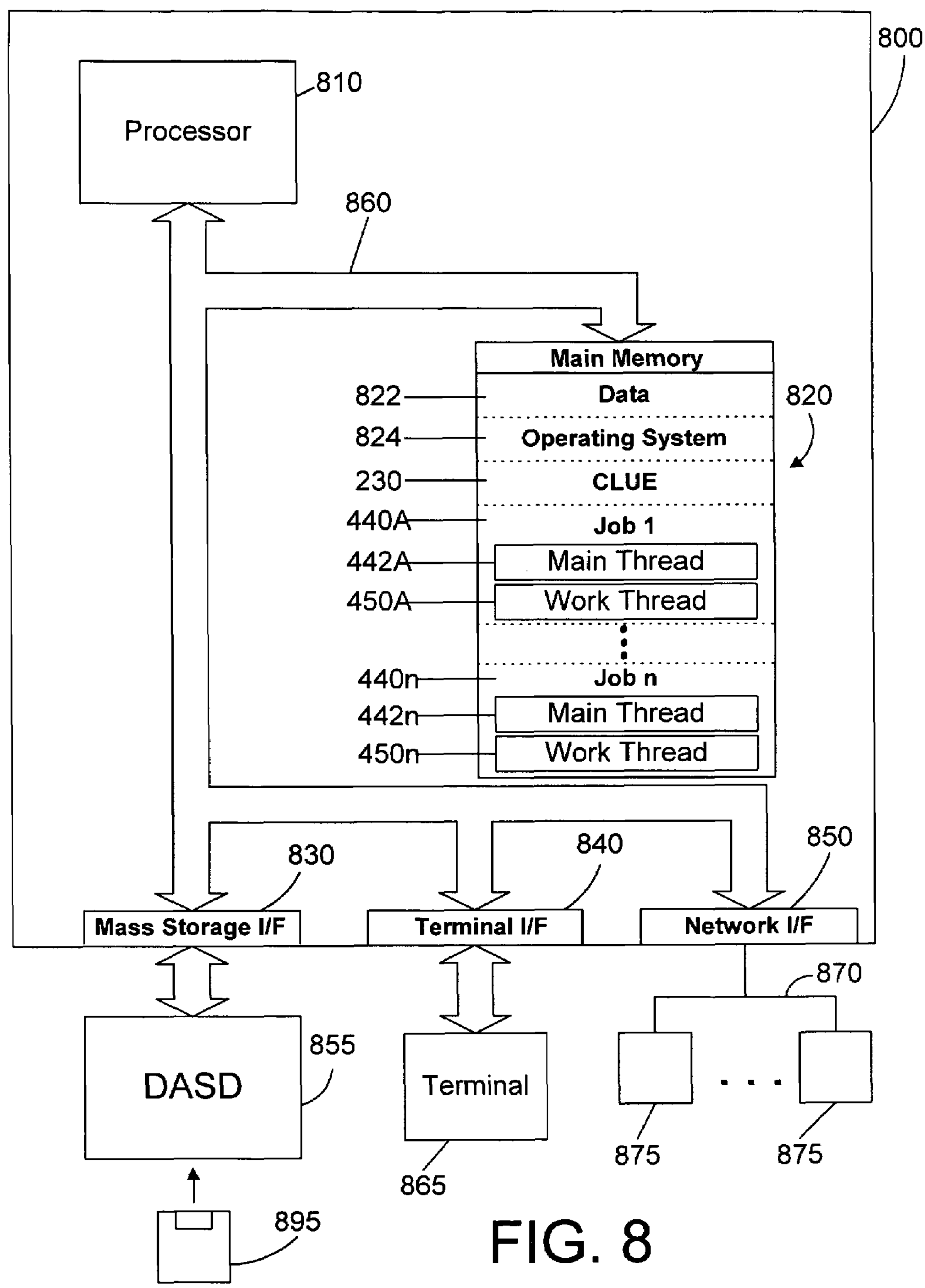
FIG. 8 is a block diagram of a computer system in accordance with the present invention that serves as a node in a cluster.

Referring to FIG. 8, a computer system 800 is an enhanced IBM AS/400 computer system, and represents one suitable type of node 410 (FIG. 4) that can be networked together in accordance with the preferred embodiments. Those skilled in the art will appreciate that the mechanisms and apparatus of the present invention apply equally to any computer system that can be networked together with other computer systems. As shown in FIG. 8, computer system 800 comprises a processor 810 connected to a main memory 820, a mass storage interface 830, a terminal interface 840, and a network interface 850. These system components are interconnected through the use of a system bus 860. Mass storage interface 830 is used to connect mass storage devices (such as a direct access storage device 855) to computer system 800. One specific type of direct access storage device is a floppy disk drive, which may store data to and read data from a floppy diskette 895.

Main memory 820 contains data 822, an operating system 824, a cluster engine (CLUE) 230, and one or more jobs 440 that each contain a main thread 442 and one or more work threads 450. Data 822 represents any data that serves as input to or output from any program in computer system 800. Operating system 824 is a multitasking operating system known in the industry as OS/400; however, those skilled in the art will appreciate that the spirit and scope of the present invention is not limited to any one operating system. CLUE 230 is a cluster engine that communicates with other computer systems in a defined cluster. In the preferred embodiments, CLUE 230 enforces ordered messages, which means that each member in the cluster will see messages in the same order. In the preferred embodiments, CLUE 230 is a known cluster engine with functions as described above with respect to FIGS. 2–4. However, it is equally within the scope of the present invention to provide a cluster engine 230 that has new or different attributes when compared to known cluster engines.

A job 440 can be a member of a group on a cluster that executes a defined protocol. Each job contains one main thread 442 and one or more work threads 450. The main thread 442 includes the features described above with reference to FIG. 5, and is defined to have no ACK rounds so it can never get stuck waiting on another member of the group. In addition, main thread 442 is defined in a way that assures it will never get stuck doing local work. This means, for example, that a main thread 442 cannot wait to acquire a local resource. The work thread(s) are described above with reference to FIG. 6. Each work thread executes a protocol 610 or a portion of a protocol 610, and communicates with the other group members (through the main thread 442 and CLUE 230) at ACK rounds defined in the protocol.

Computer system 800 utilizes well known virtual addressing mechanisms that allow the programs of computer system 800 to behave as if they only have access to a large, single storage entity instead of access to multiple, smaller storage entities such as main memory 820 and DASD device 855. Therefore, while data 822, operating system 824, CLUE 230, and jobs 440 are shown to reside in main memory 820, those skilled in the art will recognize that these items are not necessarily all completely contained in main memory 820 at the same time. It should also be noted that the term "memory" is used herein to generically refer to the entire virtual memory of computer system 800.

Processor 810 may be constructed from one or more microprocessors and/or integrated circuits. Processor 810 executes program instructions stored in main memory 820. Main memory 820 stores programs and data that processor 810 may access. When computer system 800 starts up, processor 810 initially executes the program instructions that make up operating system 824. Operating system 824 is a sophisticated program that manages the resources of computer system 800. Some of these resources are processor 810, main memory 820, mass storage interface 830, terminal interface 840, network interface 850, and system bus 860.

Although computer system 800 is shown to contain only a single processor and a single system bus, those skilled in the art will appreciate that the present invention may be practiced using a computer system that has multiple processors and/or multiple buses. In addition, the interfaces (called input/output processors in AS/400 terminology) that are used in the preferred embodiment each include separate, fully programmed microprocessors that are used to off-load compute-intensive processing from processor 810. However, those skilled in the art will appreciate that the present invention applies equally to computer systems that simply use I/O adapters to perform similar functions.

Terminal interface 840 is used to directly connect one or more terminals 865 to computer system 800. These terminals 865, which may be non-intelligent (i.e., dumb) terminals or fully programmable workstations, are used to allow system administrators and users to communicate with computer system 800. Note, however, that while terminal interface 840 is provided to support communication with one or more terminals 865, computer system 800 does not necessarily require a terminal 865, because all needed interaction with users and other processes may occur via network interface 850.

Network interface 850 is used to connect other computer systems and/or workstations (e.g., 875 in FIG. 8) to computer system 800 across a network 870. Network 870 represents the logical connections between computer system 800 and other computer systems on the network 870. The present invention applies equally no matter how computer system 800 may be connected to other computer systems and/or workstations, regardless of whether the network connection 870 is made using present-day analog and/or digital techniques or via some networking mechanism of the future. In addition, many different network protocols can be used to implement a network. These protocols are specialized computer programs that allow computers to communicate across network 870. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks (e.g., 895 of FIG. 8) and CD ROM, and transmission type media such as digital and analog communications links.

Figure 9:
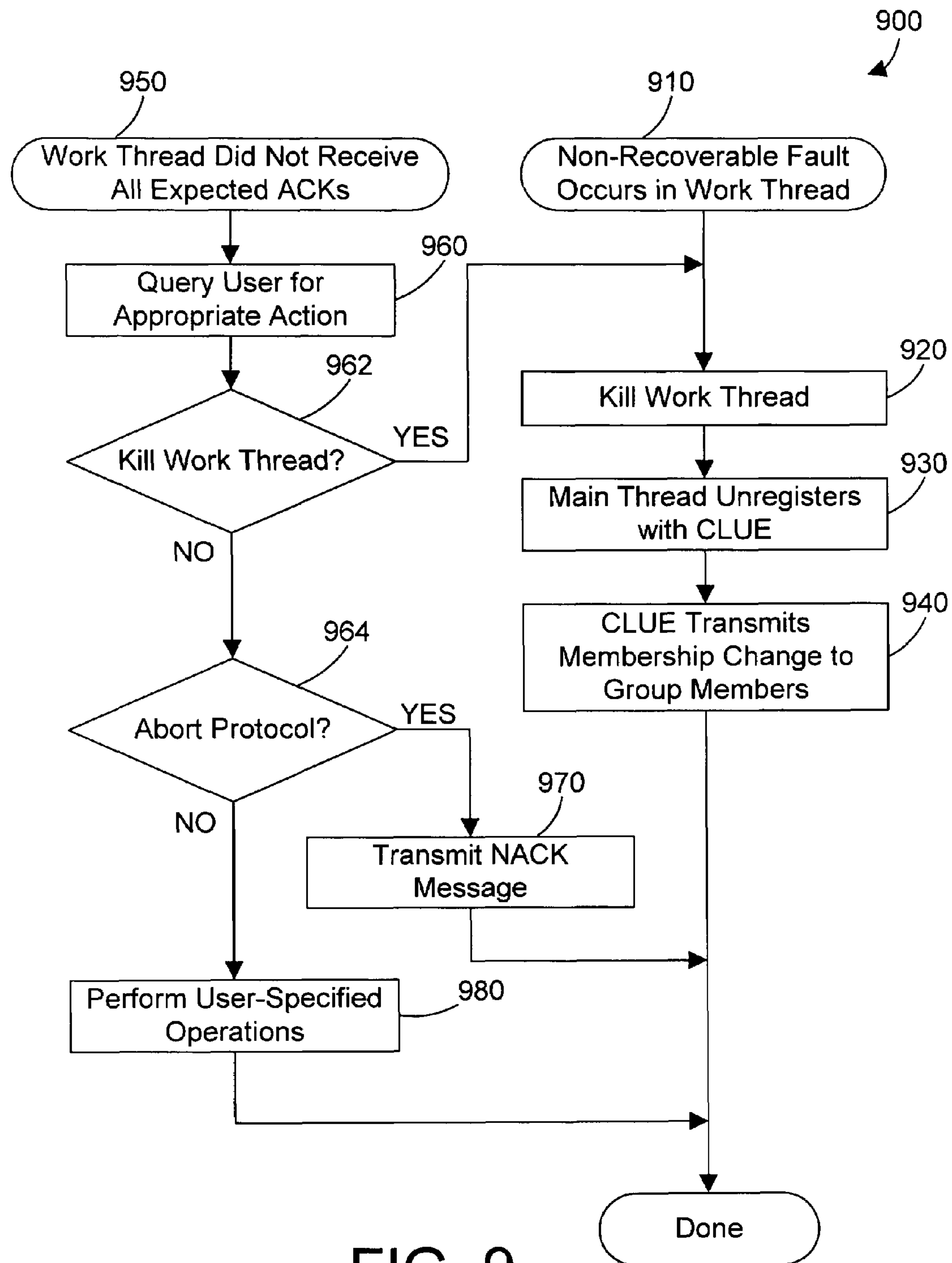
FIG. 9 is a block diagram of a method in accordance with the preferred embodiments for processing faults encountered by a work thread.

Referring to FIG. 9, a method 900 illustrates the steps a main thread 442 performs in processing an error in a group member during the execution of a protocol. Because the main thread is defined to have no ACK rounds, and because the protocol is defined to do only local work between ACK rounds, some of the error conditions that exist in prior art systems have been eliminated in the system and method of the preferred embodiments. With a system in accordance with the preferred embodiments, two errors 910 and 950 are considered. Step 910 is an error that occurs when a non-recoverable fault occurs in a work thread. When this happens, the main thread kills the work thread (step 920). The main thread then unregisters with CLUE (step 930), which causes CLUE to transmit the membership change to the remaining group members (step 940). This membership change serves as notification to the other group members that the group member that unregistered with CLUE is no longer alive.

Another error that can occur is when a work thread 450 does not receive an ACK from all members during an ACK round (step 950). When this happens, the user is queried to determine which action the user wishes to take (step 960). If the user specifies that the work thread should be terminated (step 962=YES), the work thread is terminated by executing steps 920, 930 and 940 described above. If the user does not want to kill the work thread (step 962=NO), the user may instead specify to abort the protocol (step 964=YES), which causes the main thread 442 to send a NACK message. This NACK message informs the group that the member that sent the NACK is no longer alive. Because a membership change message received from CLUE is treated as a NACK message from the missing member, in the preferred embodiments steps 940 and 970 have the same impact on remaining members in the group. If the user does not specify to abort the protocol (step 964=NO), the user can then perform some other user-specified operations to determine and remediate the cause of the failure (step 980). For example, the user could send a query message to members of a group. If one member is waiting for something local to occur (such as obtaining a local resource), the main thread for that member can report the status to the user. The user can then take appropriate action, such as killing a job that currently has that resource, so the current job can run to completion.

A passive liveness monitor in accordance with the preferred embodiments is possible due to a main thread that is always responsive (by having no ACK rounds and by not being able to get stuck doing local operations), due to a protocol definition that performs only local work between ACK rounds, and due to the ability to unregister with CLUE, which causes CLUE to generate a membership change that is seen by all the members.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

We claim:

1. An apparatus comprising:
at least one processor;
a memory coupled to the at least one processor;
a cluster engine residing in the memory and executed by the at least one processor;
a job residing in the memory and executed by the at least one processor, the job including:
at least one work thread that performs at least one predefined task, wherein the at least one predefined task comprises a protocol that includes at least one acknowledge (ACK) round, and that performs only local processing between ACK rounds; and
a main thread that receives messages from at least one computer system coupled to the apparatus, that routes appropriate messages from the at least one computer system to the at least one work thread, and that signals to the cluster engine when at least one fault occurs when the at least one work thread performs the at least one predefined task.

2. The apparatus of claim 1 wherein the main thread performs only local processing.

3. The apparatus of claim 1 wherein the main thread does not wait for any local resource, and thus is guaranteed to receive a message sent by the cluster engine.

4. The apparatus of claim 1 wherein the signal to the cluster engine comprises an unregistration with the cluster engine.

5. The apparatus of claim 4 wherein the unregistration with the cluster engine causes the cluster engine to generate a membership change message.

6. A networked computer system comprising:
a cluster of computer systems that each includes:
a network interface that couples each computer system via a network to other computer systems in the cluster;
at least one processor;
a memory coupled to the at least one processor;
a cluster engine residing in the memory and executed by the at least one processor;
a job residing in the memory and executed by the at least one processor, the job including:
at least one work thread that executes a predefined protocol that includes at least one acknowledge (ACK) round, wherein the protocol only performs local tasks between ACK rounds; and
a main thread that registers with the cluster engine to become a member of a group, that receives messages from at least one computer system coupled to the apparatus, that routes appropriate messages from the at least one computer system to the at least one work thread, and that signals to the cluster engine when at least one fault occurs when the at least one work thread performs the at least one predefined task by unregistering with the cluster engine, wherein unregistering with the cluster engine causes the cluster engine to generate a membership change to remaining members of the group.

7. A computer-implemented method for notifying jobs that form a group in a clustered computing environment when a member of the group is no longer alive, the method comprising the steps of:
defining a task, wherein the task comprises a protocol that includes at least one acknowledge (ACK) round, and that performs only local processing between ACK rounds;
providing a cluster engine for each member of the group that communicates with the other cluster engines in the group;
providing at least one work thread for each job that executes the task;
providing a main thread for each job, the main thread performing the steps of:
receiving messages from other members of the group via the cluster engine corresponding to the main thread;
routing appropriate messages from the other members of the group to the at least one work thread; and
signaling to the cluster engine when at least one fault occurs during the execution of the task by the work thread.

8. The method of claim 7 wherein the main thread performs only local processing.

9. The method of claim 7 wherein the main thread does not wait for any local resource, and thus is guaranteed to receive a message sent by the cluster engine.

10. The method of claim 7 wherein the step of signaling to the cluster engine comprises the step of unregistering with the cluster engine.

11. The method of claim 10 wherein the step of unregistering with the cluster engine causes the cluster engine to generate a membership change message to remaining members of the group.

12. A computer-implemented method for notifying jobs that form a group in a clustered computing environment when a member of the group is no longer alive, the method comprising the steps of:

defining a protocol that includes at least one acknowledge (ACK) round, and that performs only local processing between ACK rounds;

providing a cluster engine for each member of the group that communicates with the other cluster engines in the group;

providing at least one work thread for each job that executes at least a portion of the protocol;

providing a main thread for each job, the main thread performing the steps of:

registering with the cluster engine to become a member of the group;

receiving messages from other members of the group via the cluster engine corresponding to the main thread;

routing appropriate messages from the other members of the group to the at least one work thread;

wherein the main thread performs only local processing and does not wait for any local resource, and thus is guaranteed to receive a message sent by the cluster engine;

unregistering with the cluster engine when at least one fault occurs during execution of the protocol.

13. The method of claim 12 wherein the step of unregistering with the cluster engine causes the cluster engine to generate a membership change message to remaining members of the group.

14. A program product on a tangible computer-readable medium comprising:

a computer program comprising:

at least one work thread that performs at least one predefined task, wherein the at least one predefined task comprises a protocol that includes at least one acknowledge (ACK) round, and that performs only local processing between ACK rounds; and a main thread that receives messages from a corresponding cluster engine, that routes appropriate messages from the cluster engine to the at least one work thread, and that signals to the cluster engine when at least one fault occurs when the at least one work thread performs the at least one predefined task.

15. The program product of claim 14 wherein the tangible computer-readable medium comprises recordable media.

16. The program product of claim 14 wherein the main thread performs only local processing.

17. The program product of claim 14 wherein the main thread does not wait for any local resource, and thus is guaranteed to receive a message sent by the cluster engine.

18. The program product of claim 14 wherein the signal to the cluster engine comprises an unregistration with the cluster engine.

19. The program product of claim 18 wherein the unregistration with the cluster engine causes the cluster engine to generate a membership change message.

20. A program product on a tangible computer-readable medium comprising:

a computer program comprising:

at least one work thread that performs a predefined protocol that includes at least one acknowledge (ACK) round, wherein the protocol only performs local tasks between ACK rounds; and a main thread that registers with the cluster engine to become a member of a group, that receives messages from at least one computer system coupled to the apparatus, that routes appropriate messages from the at least one computer system to the at least one work thread, and that signals to the cluster engine when at least one fault occurs when the at least one work thread performs the at least one predefined task by unregistering with the cluster engine, wherein unregistering with the cluster engine causes the cluster engine to generate a membership change to remaining members of the group.

21. The program product of claim 20 wherein the tangible computer-readable medium comprises recordable media.

* * * * *